United States Patent [19]

Schafft

[11] 4,112,168
[45] Sep. 5, 1978

[54] HIGH STIFFNESS SPEAKER CONE

[75] Inventor: Hugo Willy Schafft, Des Plaines, Ill.

[73] Assignee: Motorola, Inc., Schaumburg, Ill.

[21] Appl. No.: 780,619

[22] Filed: Mar. 23, 1977

[51] Int. Cl.² .............................................. B32B 7/14
[52] U.S. Cl. .............................. 428/198; 179/181 R; 181/166; 156/245; 156/285; 428/66; 428/288; 428/317; 428/320
[58] Field of Search .................. 428/64, 66, 137, 138, 428/139, 198, 288, 296, 297, 303, 304, 317, 320, 359, 360; 179/181 R, 180; 181/166, 157; 156/242, 245, 285

[56] References Cited

U.S. PATENT DOCUMENTS

| 2,568,144 | 9/1951 | Cremer et al. | 428/198 |
| 2,974,204 | 3/1961 | Supitilov | 179/181 R |
| 3,183,996 | 5/1965 | Capaul | 428/320 |
| 3,617,654 | 11/1971 | Heidrich | 181/166 |
| 3,649,435 | 3/1972 | Varlas | 428/297 |
| 3,930,130 | 12/1975 | Boszor | 179/181 R |

Primary Examiner—William J. Van Balen

Attorney, Agent, or Firm—James W. Gillman; Victor Myer

[57] ABSTRACT

An improved lightweight, stiff member for use as a speaker diaphram is formed from a porous layer of high stiffness fibers. The fibers are randomly oriented, spaced-apart, and crossover each other at given points to form a porous layer with a given thickness. The fibers are bonded to each other at the given crossover points. A gastight film is also bonded to the layer of fibers thereby providing a gastight member having high flexural stiffness.

A method for making a lightweight, stiff member by the application of a dilute solution of an epoxy resin and a solvent to a porous layer of randomly oriented, spaced-apart, high stiffness fibers. The solvent is removed, leaving a thin layer of epoxy resin on the fibers. The porous layer of fibers and a gastight overlying sheet are pneumatically formed into a predetermined configuration. The epoxy resin binder is then heated and cured under heat and pressure, thereby flowing to and forming rigid bonds between the fibers at the crossover points and securing the gastight sheet to the fibers.

14 Claims, 5 Drawing Figures

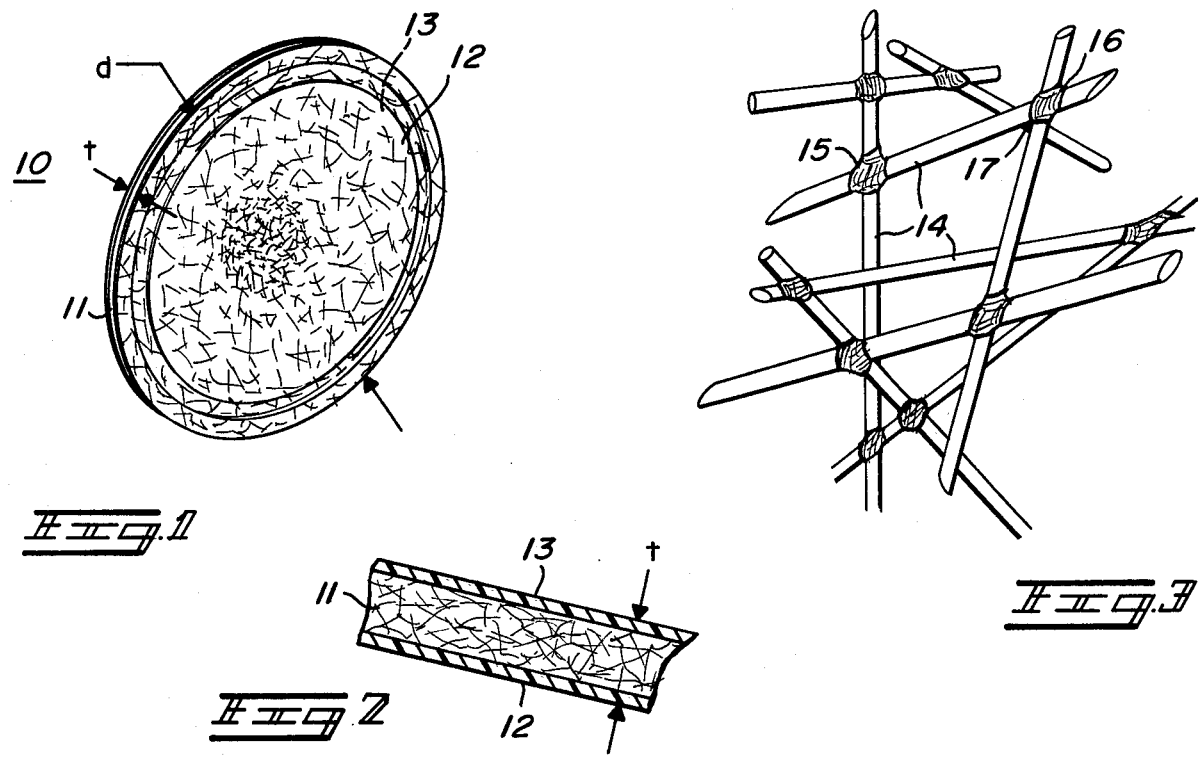
Fig. 1
Fig. 3
Fig. 2
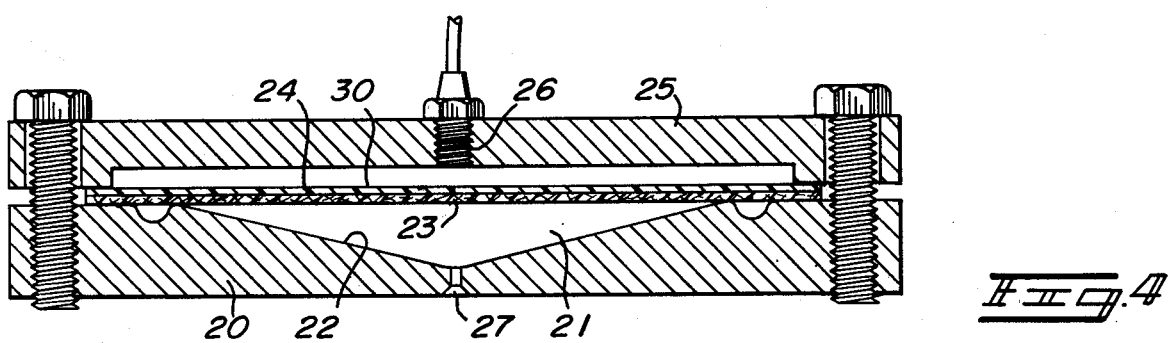
Fig. 4
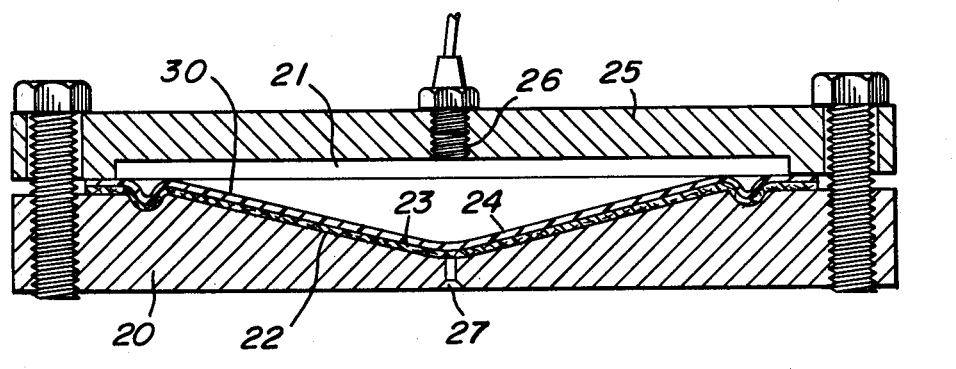
Fig. 5

HIGH STIFFNESS SPEAKER CONE

BACKGROUND OF THE INVENTION

1. Field of the Invention

This invention relates generally to members having a high stiffness such as used in electro-acoustical transducers. In particular, this invention relates to an improved lightweight, high stiffness speaker diaphram member and a method for fabricating such a member.

2. Description of the Prior Art

Loudspeaker diaphrams are well-known in the prior art and are used to match the relatively low acoustic impedance of air to the relatively high mechanical impedance of a loudspeaker drive system. The driver for a loudspeaker generally can deliver a force of large magnitude but delivers a relatively small displacement. A loudspeaker diaphram having a large area provides the means by which a large volume of air can be moved by a driver having a relatively small displacment.

It is desirable to use material as strong and as light as possible for a speaker diaphram so that minimal mechanical energy is used to accelerate the diaphram mass, providing good transient response and preventing buckling of the diaphram under heavy loading.

The specific stiffness modulus S of a material is a measure of resistance to deflection of a unit weight of material. The specific stiffness modulus of a material is defined as the ratio of the modulus of elasticity Q, Young's modulus, to the density $\rho$ of the material.

$$S = \rho/Q \tag{1}$$

Loudspeakers using presently available diaphram materials do not lend themselves to miniaturization by reduction of the cone diameter. This is because reduction of the cone diameter results in loss of efficiency and poorer low frequency response. It is desirable and theoretically possible to reduce the height of a speaker cone in order to reduce the overall volume of a loudspeaker without losing efficiency and low frequency response. In order to most effectively reduce cone height and still obtain the same efficiency and low frequency response as current loudspeakers, it is necessary to use speaker cone materials having improved properties such as contemplated by the instant invention.

Speaker diaphrams may be made from solid metals, such as beryllium, which has a very high specific stiffness S but which is also very expensive and toxic. Other metals have relatively high densities $\rho$ and, consequently, have relatively low specific stiffness moduluses S.

Paper is commonly used as a speaker diaphram material. The cellulose fibers of paper are inexpensive, have a relatively high specific stiffness modulus S, have a high tensile strength, bond to each other without binders, may be formed to certain configuration, and may be formed to be relatively gastight. One of the disadvantages of paper as a cone material is its sensitivity to humidity and to heat, causing cones made of such material to eventually deteriorate. Impregnation or coating with a plastic humidity-resistant material adds undesirable weight.

Paper speaker cones are presently made by two processes, a felting process and and seamed construction process. The felting process involves applying a controlled vacuum to a perforated suction mold of the desired cone shape which is immersed in a solution of cellulose fibers. A layer of randomly oriented fibers is deposited on the mold. The felted shape is then pressed, dried, and trimmed. The seamed construction process involves forming a cone with a sheet of paper and gluing the overlapping edges together. The performance of a cone having a seam is somewhat inferior to that of a seamless type and the shape of such a speaker is limited to either straight or large radius cross sections.

SUMMARY OF THE INVENTION

It is, therefore, an object of this invention to provide an improved lightweight, stiff acoustic member and a method for fabricating the same.

It is another object of the invention to provide an improved loudspeaker diaphram material having a high specific stiffness modulus and a high flexural wave propagation velocity.

Another object of the invention is to provide an improved gastight loudspeaker diaphram using a high stiffness fibrous material of porous structure in conjunction with a gastight sealing means.

It is another object of the invention to provide an improved loudspeaker cone having reduced height without sacrificing radiating efficiency or power handling capabilities.

It is another object of the invention to provide an improved lightweight, stiff acoustic diaphram material which resists heat and high humidity.

A still further object of the invention is to provide an improved method for fabricating an improved lightweight, stiff acoustic member which may be fabricated to any desired shape.

In practicing this invention an improved lightweight, stiff acoustic material for use as a speaker diaphram is provided which includes a porous layer of high stiffness fibers, said fibers being randomly oriented, spaced-apart, and crossing over at given points to form a porous layer having a predetermined thickness profile. Means for gastight sealing the layer of porous fibers along a first surface, means for bonding together the fibers at the given crossover points, and means for bonding the gastight sealing means to a surface of the layer of fibers are provided.

The method for making a lightweight, stiff acoustic material for use as a loudspeaker diaphram involves applying a dilute solution of an unactivated binder material and a solvent to a layer of randomly oriented, spaced-apart high stiffness fibers, the fibers having given crossover points. The solvent is removed in order to form a thin film of binder material on the fibers. The layer of fibers and a gastight overlying sheet are formed into a predetermined configuration and the binder is activated to flow and form rigid bonds between the fibers at the crossover points and between the fibers and the overlying gastight sheet.

BRIEF DESCRIPTION OF THE DRAWINGS

For a more complete understanding of the invention, reference is made to the drawings in which:

FIG. 1 is a perspective view of a loudspeaker diaphram according to the invention.

FIG. 2 is a cross-sectional view of a portion of a speaker diaphram.

FIG. 3 is an enlarged fragmentary view of the structure of a member according to the invention.

FIG. 4 is a partial cross-sectional view illustrating the placement of a fibrous sheet and a gastight sheet in a forming mold.

FIG. 5 is a partial cross-sectional view illustrating a diaphram according to the invention being pneumatically formed against the mold.

DESCRIPTION OF THE PREFERRED EMBODIMENT

Referring to the drawings, FIG. 1 and FIG. 2, the speaker diaphram 10 of this embodiment is a cone having a predetermined diameter $d$ and a predetermined height. It is sometimes desirable that the height be as large as possible in order to provide the cone with maximum stiffness when the speaker is operating at low frequencies in the piston mode as explained below. On the other hand it is desirable to have the height as small as possible, to provide a low profile for the speaker assembly utilizing such a diaphram as well as when operating at higher frequencies in the flexural mode as explained below. For purposes of obtaining a stiff cone, it is desirable that the diameter $d$ of the cone be as small as possible. On the other hand, it is desirable that the diameter $d$ of the diaphram 10 be as large as possible so that a large volume of air may be displaced with a small displacement of the cone. A small displacement is desirable because it reduces the linear displacement required to be traversed by the electromechanical driver (not shown) used to drive a speaker cone; such drivers do not effectively operate with large displacements. A speaker cone material having a higher specific stiffness modulus S allows a speaker having a given performance to be constructed with a reduced height or an increased diameter $d$ in comparison with prior art paper cone speakers as explained in the previous discussion of the prior art.

Since work is required to accelerate the mass of a speaker diaphram, a speaker diaphram having a low density $\rho$ would obviously be more efficient diaphram. However, if the strength of the material, as represented by Young's modulus Q, is not sufficiently large, the power handling capability of the diaphram would be seriously impaired. The frequency range over which all parts of a speaker diaphram move in phase with each other, but not necessarily at the same amplitude, is called the piston range of the diaphram. The diameter $d$ together with the height, curvature, and material of the diaphram determine the upper cut-off frequency of the piston range. Increasing the height of a speaker diaphram increases its stiffness without increasing its mass. A deep cone having high stiffness is most advantageously used in low frequency piston mode operation.

In contrast, higher frequency speakers more advantageously use very shallow diaphrams for two reasons. The first reason is that at frequencies above the piston range of a diaphram, acoustic energy is transmitted according to a travelling wave mode. In this mode, the speaker diaphram acts as a distributed mass-compliance delay line for the flexural wave that is induced by the driver driving the apex of the speaker diaphram cone. As the flexural wave travels from the apex toward the periphery, the cone energy is transmitted to the surrounding media. Maximum acoustic energy is transmitted to the surrounding media when the flexural wave propagation velocity through the speaker diaphram coincides with the propagation velocity of air. This requires that the cone be quite shallow, that is, of relatively low height. The second reason for requiring the use of very shallow speaker diaphrams at higher frequencies is that better quality speaker systems require a uniform high frequency dispersion pattern. This requirement can be approached by making the propagation velocity through the speaker diaphram somewhat less than the propagation velocity of air, requiring a shallow speaker diaphram.

Diaphrams in speakers that are intended to be operated over a wide frequency range often have a curvilinear shape so that the speaker diaphram is deep near the apex of the diaphram and shallower towards the periphery of such a diaphram. While a straight or curvilinear cone of uniform cross section may be fabricated according to the present invention, predetermined curvilinear or straight shapes of thicker cross section near the high stress apex area of a cone with thinner peripheral sections may be fabricated according to the present invention as required.

For optimum performance, the drive level at which a speaker diaphram operates in the piston mode should be as high as possible. A speaker diaphram material having the highest specific modulus S would be most desirable. However, it is also necessary that a speaker diaphram material be thick enough so that when driven at high power levels, the diaphram would not exhibit an elastic instability resulting in buckling or subharmonic breakup. An optimum diaphram material to prevent the above instability problem would be a low density $\rho$ material having a high specific modulus S and also a relatively thick cross-sectional area such a contemplated by the instant invention. The importance of the thickness $t$ of the material is discussed below.

At some higher operating frequency beyond the piston range, the diaphram may break up into a first overtone vibration mode having a zero displacement nodal circle formed at a distance from the periphery of the speaker diaphram cone. In this mode of operation, the area outside the nodal circle will move in a phase opposite to that of the area inside the nodal circle. Air will be moved from one of these areas to the other and the energy transmitted to the surrounding media will be minimum, which condition is measured as a deep dip in the speaker frequency response curve. Higher order overtone modes occur at higher operating frequencies. It is therefore desirable that the piston range of a speaker diaphram be extended as high as possible.

The frequency at which the first order overtone mode occurs depends on the flexural wave propagation velocity C, where $$C = \sqrt{QK^2/\rho} \qquad (2)$$

with $K$ being the radius of gyration of the material, where $K$ is proportional to $t$ the thickness of the speaker diaphram material.

The flexural wave propagation velocity C provides an indicator for optimizing the performance of a speaker in accordance with the above discussion. The radius of gyration being proportional to the thickness of the speaker diaphram results in the flexural wave propagation velocity C being directly proportional to the thickness $t$. Therefore, an optimized speaker diaphram will have a thickness $t$ as large as possible so that when a speaker is operating in either the piston mode or the flexural mode, optimum strength and the highest flexural velocity may be obtained.

A specific embodiment of a speaker cone according to the invention is shown in FIG. 1 with FIG. 2 showing an enlarged section of the cone. A porous layer 11 of high stiffness fibers is sandwiched between front and rear thin plastic sheets 12 and 13, respectively. Any suitable plastic sheet material such as that available under the tradename Mylar from the Du Pont Company may be utilized, which material provides a gastight seal in very thin, stretchable sheets. The layer of fibers may be formed for example from a predetermined mixture of crystalline graphite fibers and organic aramide fibers, the organic aramid fibers being produced by the Dupont Company under the tradename Kevlar. Other low density materials having a high specific modulus S of a metallic, organic, mineral, or synthetic nature may also be used. Crystalline graphite fibers are made by a thermoconversion process and have a modulus of elasticity, Young's modulus, between 30 and 75 million pounds per square inch, a tensile strength of approximately 300,000 pounds per square inch, and a density of 1.95. Kevlar is an organic aramid fiber and has a modulus of elasticity of 20 million pounds per square inch, a tensile strength of 400,000 pounds per square inch, and a density of 1.45.

FIG. 3 shows in enlarged form the character of the bonding of the fibers at the crossover points in accordance with the instant invention. Typical fibers 14 crossover each other as shown at a typical crossover point 15. A bonding agent 16, such as an epoxy resin or other high specific modulus cements, is shown concentrated around a crossover point, forming fillets (typically shown at 17). The particular method used to bond the fibers together using a minimum of bonding agent will be described below. The porous nature of the fiber layer 11 is also evident from FIG. 3. A porous layer having a thick cross-section is thereby formed.

The fibrous layer 11 is also bonded to the plastic sheets 12, 13 by the same bonding means 16 which bonds the fibers together. The rear plastic sheet 13 provided on the rear surface of the loud speaker diaphram 10 is not required to conform to the inventive concept disclosed herein because the front plastic sheet 12 provides the essential gastight sealing means for the diaphram 10. A thin metal foil may be used as a plastic sheet.

Referring to FIG. 4 and FIG. 5, a mold 20 is shown having a cavity 21 contained therein. A surface 22 of the mold 20 is shaped to permit a particular speaker cone shape to be formed.

In practicing the method of this invention, a porous layer 23 of randomly oriented, spaced apart fibers as described above is dipped into a dilute epoxy solution. Excess epoxy solution is allowed to drip off and the layer is exposed to air until most of the solvent has evaporated and a thin layer of epoxy forms on the surface of the fibers. The fibrous layer 23 is then placed over the cavity 21 in the mold 20, said mold being heated to a temperature of approximately 200° C. A stretchable plastic sheet 24 is placed over the layer 23 and a cover 25 is clamped air tight against the mold 20. The cover 25 has a port 26 connected to a source of high pressure air (not shown). The mold 20 has a small opening 27 positioned at the apex of the cavity 21 and providing an exit for the air exhausted from the mold. After the plastic sheet 24 and the layer 23 come up to mold temperature, air pressure of up to 250 pounds per square inch is applied from the air source through the port 26 against the upper surface 30 of the plastic sheet 24. As shown in FIG. 5, the air pressure stretches the plastic film 12 and forces the fibrous layer 23 against the surface 22 of the mold 20, the plastic sheet 24 provides a gastight seal for the high pressure air contained within the cavity 21. The heated epoxy becomes less viscous and is drawn by capillary action toward the fiber crossover points, where the epoxy is cured for a predetermined time and forms a permanent bond between the fibers. The plastic sheet 24 is similarly bonded to the fibers.

While a particular embodiment of a member and a method of the invention have been shown and described, it should be understood that the invention is not limited thereto since many modifications may be made. It is therefore contemplated to cover by the present application any and all such modifications that fall within the true spirit and scope of the basic underlying principles disclosed and claimed herein.

I claim:

1. An improved lightweight, stiff member comprising:
   a porous layer of high stiffness fibers, said fibers being randomly oriented, spaced-apart, and crossing over at given points to form a porous layer having a predetermined thickness profile, said layer of fibers having a first major surface;
   means for gastight sealing the layer of fibers along the first surface of the layer; and
   means for bonding together the fibers at the given crossover points and for bonding the gastight sealing means to the first major surface of the layer of fibers.

2. The member of claim 1 wherein the synthetic fibers are crystalline graphite fibers.

3. The member of claim 1 wherein the synthetic fibers are organic aramid fibers.

4. The member of claim 1 wherein the synthetic fibers are a mixture of graphite and organic aramid fibers.

5. The member of claim 1 wherein the gastight sealing means is a thin plastic sheet overlying the layer of fibers.

6. The member of claim 1 wherein the gastight sealing means is a thin metal foil overlying the layer of fibers.

7. The member of claim 1 wherein the bonding means is a high specific modulus cement.

8. The member of claim 1 wherein the bonding means is an epoxy resin.

9. The member of claim 1 wherein the member is formed with a predetermined configuration to function as a diaphragm for an electro-acoustic transducer.

10. A method for making a lightweight, stiff acoustic member comprising the steps of:
    applying a dilute solution of a predetermined amount of an unactivated binder and a solvent to a porous layer of randomly oriented, spaced-apart, high stiffness fibers, said fibers having given crossover points;
    removing the solvent to form a thin layer of unactivated binder on the fibers;
    forming the layer of fibers and a gastight overlying sheet into a predetermined configuration; and
    activating the binder to flow and bond the fibers at the crossover points and to bond the overlying gastight sheet to the fibers.

11. The method of claim 10 wherein the applying of a dilute solution comprises dipping the layer of fibers into the dilute solution and allowing excess solution to drip off.

12. The method of claim 10 wherein the forming of the layer of fibers and the gastight overlying sheet into a predetermined configuration further comprises:

pneumatically forcing the layer of fibers and the gastight overlying sheet into a mold.

13. A method for making a lightweight, stiff acoustic member comprising the steps of:
applying a dilute solution of a predetermined amount of an epoxy resin and a solvent to a porous layer of randomly oriented, spaced-apart, high stiffness synthetic fibers, said fibers having given crossover points;
removing the solvent in order to form a thin layer of the epoxy resin on the fibers;
pneumatically forming the layer of fibers and an overlying gastight sheet into a predetermined configuration in a heated mold; and
curing the epoxy resin to form rigid bonds between the fibers at the crossover points and between the fibers and the sheet.

14. The method of claim 13 wherein the pneumatic forming of the layer of fibers and the sheet and the curing of the epoxy further include heating the mold to two hundred degrees centigrade and applying a pressure of two hundred pounds per square inch to the layer of fibers and the sheet.

* * * * *